United States Patent [19]

Osawa

[11] Patent Number: 5,125,777
[45] Date of Patent: * Jun. 30, 1992

[54] ROTARY TOOL

[76] Inventor: Eiichi Osawa, 5-16-54 Yoshida Higashi-Osaka, Osaka, Japan

[*] Notice: The portion of the term of this patent subsequent to Jul. 23, 2008 has been disclaimed.

[21] Appl. No.: 693,862

[22] Filed: May 1, 1991

Related U.S. Application Data

[63] Continuation-in-part of Ser. No. 547,633, Jul. 2, 1990, Pat. No. 5,033,923.

[51] Int. Cl.⁵ .................................................. B23C 5/16
[52] U.S. Cl. ...................................... 409/234; 51/169; 74/573 R; 279/129; 279/158; 407/30; 407/120; 408/239 R

[58] Field of Search ............... 279/1 C, 1 J, 1 ME; 407/30, 120; 408/238, 239 R; 74/573 R; 57/169; 82/903; 409/232, 234, 131, 132

[56] References Cited

U.S. PATENT DOCUMENTS 861,463 7/1907 Hyde ...................................... 51/169
5,033,923 7/1991 Osawa .............................. 279/1 ME Primary Examiner—Steven C. Bishop
Attorney, Agent, or Firm—Welsh & Katz, Ltd.

[57] ABSTRACT

A rotary tool is provided with a shank and a collar-like section, and further includes a plurality of screw-threaded holes drilled in a vertical end face of the collar-like section, in parallel relationships with the axis of the collar-like section. A plurality of balancing weights are removably screwed in the holes as required to balance the tool.

9 Claims, 1 Drawing Sheet

ROTARY TOOL

This application is a continuation-in-part of Ser. No. 07/547,633, filed Jul. 2, 1990, now U.S. Pat. No. 5,033,923.

BACKGROUND OF THE INVENTION

The present device relates to a high-speed rotary tool such as a holder for a drill, rotary cutting, grinding tools or the like.

Where mechanical machining is performed by a drilling machine, boring lathe or grinding machine, the vibration of the rotary tool presents a serious problem. One of the causes of the problem is considered to be the forced vibration due to the rotary tool being or becoming unbalanced.

As one example of a conventional rotary tool, there is a tool holder (a) shown in FIG. 5, which is provided with a clamp section (b) for an automatic tool exchanger. The tool holder has at one end thereof a tapered shank (c) and a tool mounting section (d) at the other end thereof, with the clamp section (b) being provided with an engaging groove coming into engagement with the main spindle of a machine tool.

Where the tool holder (a) is used with a high-speed rotary tool, it is subjected to a balancing test using a balancing machine. The angle of the tool holder and the weight thereof corresponding to that angle are indicated by the balancing machine. When the weight of the tool holder is large, the excess portion of the holder is removed by cutting, thereby correcting the unbalanced condition of the holder.

However, the above-mentioned unbalancing correcting method requires skill and a considerable amount of time. In order to obtain a high degree of accuracy of balancing, it is extremely cumbersome, which results in lowering the working efficiency to a considerable degree.

The present device has been made in view of the above-described situation. Accordingly, an object of the present device is to provide a rotary tool which is capable of being balanced easily, accurately and efficiently.

SUMMARY OF THE INVENTION

In order to achieve the above object, the present device employs the following technical means. A rotary tool is provided with a shank and a collar-like section. A plurality of screw-threaded holes are drilled in a vertical end face of the collar-like section in parallel relationship with the axis of the collar-like section, and a plurality of balancing weights are removably screwed into the holes.

According to the present device, it is sufficient that a weight or weights corresponding to the weight of the lower weight portion of the tool be inserted into the screw-threaded hole or holes in that portion according to the results of the balancing test.

Further, the balancing operation of the rotary tool may be performed in such a manner that the weights, each having a predetermined weight, are screwed into all the screw-threaded holes in advance. After conducting a balancing test, any unsuitable weight in view of the results of the test is replaced with another having a different weight.

BRIEF DESCRIPTION OF THE DRAWINGS

FIGS. 1 through 4 show one embodiment of the present device, wherein:

FIG. 1 is a front view (in partial cross-section) of a rotary tool according to the present device, FIG. 2 is a left-side view of the rotary tool of FIG. 1, FIG. 3 is a right-side view of the rotary tool of FIG. 1, and FIG. 4 is a perspective view of a weight used in the present device.

DETAILED DESCRIPTION OF THE INVENTION

The present device will now be described with reference to the accompanying drawings.

Figure 1:
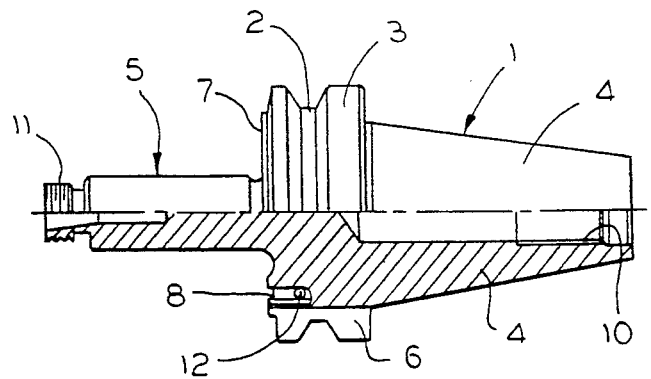
Figure 2:
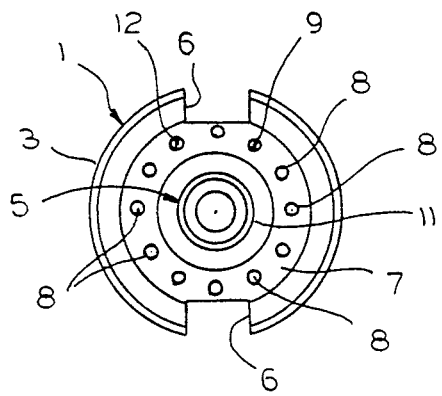
Figure 3:
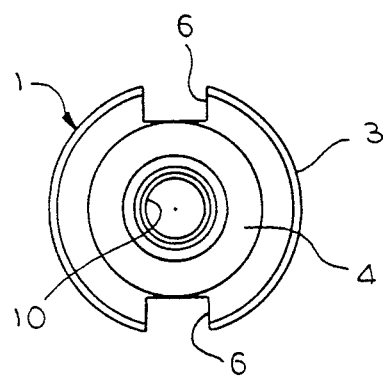

In FIGS. 1 through 3, reference numeral 1 designates a rotary tool (a collet chuck holder or a drill chuck holder, etc.) which is provided at the center thereof with a clamp section for engagement with an automatic tool exchanger, that is, a collar-like section 3 having a peripheral groove 2 at the center, a tapered shank 4 formed at one side thereof in the axial direction so as to engage the main spindle of a machine tool, and a tool mounting section 5 formed at the side opposite the shank 4.

On the outer periphery of the collar-like section 3 there are provided two engaging grooves 6 in symmetrical relationship with each other with respect to the axis of the section 3 so as to mate with the main spindle of the machine tool. Further, in an end face 7 of the collar-like section 3 (the side end surface adjacent to the tool mounting section 5) there are drilled a total of 12 screw-threaded holes 8 along the same circumference drawn about the axis of the section 3 at intervals of a rotational angle of 30° and in parallel relationship with that axis, so as to receive weights 9 thereto, respectively. These holes 7 have the same diameter and depth such that when the weights 9 are respectively screwed into the holes 8, each of the weights does not project from the end face 7 of the collar-like section 3.

Figure 4:
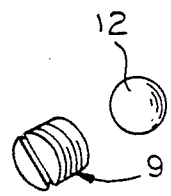
Figure 5:
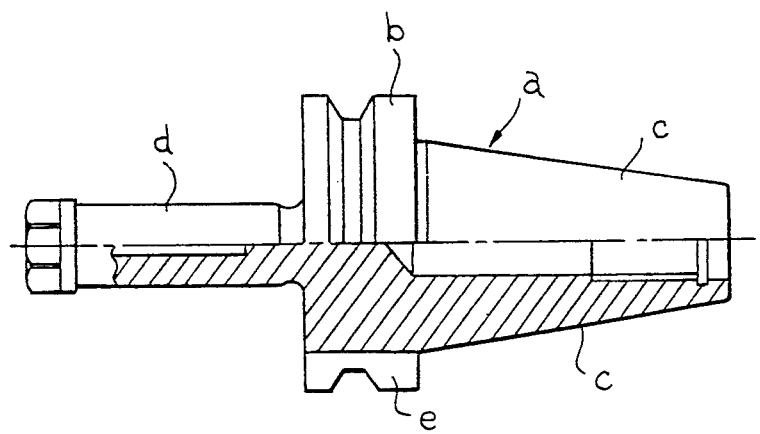
FIG. 5 is a front view (in partial cross-section) of a conventional rotary tool.

The weights 9 are in the form of an unheaded screw as shown in FIG. 4, and a number of such weights having slightly different weights (that is, length) are prepared as substitutes. In the alternative, ball weights 12 can be inserted in the holes 8 and secured by the weights 9, if desired.

Reference numeral 10 designates a screw-threaded hole for receiving a pull-tap, and reference numeral 11 designates a male-screw for receiving a chuck.

In the instant embodiment, where the rotary tool 1 is found unbalanced as a result of a balancing test using a balancing machine, since the angle of the tool 1 and the weight thereof corresponding to the angle are indicated by the balancing machine, the tool 1 can be brought into a balanced state by merely screwing into the screw-threaded hole or holes in the smaller weight portion of the collar-like section a weight or weights 9 having a weight corresponding to that portion. Ball weights 12 can also be used, if desired.

Further, as described in the foregoing, a plurality of weights 9 of a predetermined weight may be screwed into all the screw-threaded holes 8 of the rotary tool 1 in advance. When the tool 1 is found unbalanced as a result of a balancing test, any of the weights 9 causing such unbalance may be replaced with another weight having a different weight, or an appropriate ball weight 12, thereby balancing the tool 1.

The many advantages of the present invention are now apparent. The present device provides a rotary tool having a shank and a collar-like section. A plurality of screw-threaded holes are drilled in the vertical end face of the collar-like section in parallel relationships with the axis of the latter, and a plurality of balancing weights are removably screwed into the screw-threaded holes. Accordingly, the balancing operation for the rotary tool can be performed easily, accurately and efficiently, and the rotary tool requires no cutting operation. In addition, since there is no fear of the balancing weights coming out of the screw-threaded holes, it can be safely operated even at a high speed.

The present invention is not limited to the above embodiment but it may be employed for various kinds of holders other than the collet holder and high-speed rotary tools. Moreover, the screw-threaded holes may be drilled in a zigzag fashion and the weight may be made of a synthetic material besides metals.

What is claimed is:

1. A rotary tool comprising
   shank means for engaging a machine tool,
   a collar-like section secured to said shank means, said shank means and said collar-like section having a common central rotational axis,
   said collar-like section having an end face which is substantially perpendicular to said axis,
   a plurality of cylindrical orifices which extend through said end face and at least partially through said collar-like section, and
   at least one removable balancing weight for use in at least one of said orifices for balancing the rotary tool,
   whereby the rotary tool may be balanced by inserting appropriate weights in said orifices or removing weights from said orifices.

2. The rotary tool of claim 1 wherein said orifices are substantially parallel to said axis.

3. The rotary tool of claim 1 wherein said orifices are along the same circumference drawn about said axis.

4. The rotary tool of claim 1 comprising at least one ball weight secured in at least one of said orifices by said balancing weight.

5. The rotary tool of claim 1 wherein said weights do not project from said end face.

6. The rotary tool of claim 1 wherein said weights comprise unheaded screws.

7. The rotary tool of claim 1 wherein a number of said weights have different weight values.

8. A method of balancing a rotary tool having a central rotational axis, an end face substantially perpendicular to the axis, a plurality of spaced orifices which extend into the end face a selected distance from the axis, and a removable weight for use in at least one of the orifices, comprising the steps of
   securing the rotary tool in a balancing machine,
   identifying any unbalanced conditions in the rotary tool with the balancing machine, and
   inserting, removing or changing at least one weight in at least one of the orifices to correct the unbalanced condition.

9. A method of balancing a rotary tool having a central rotational axis, an end face substantially perpendicular to the axis, a plurality of spaced orifices which extend into the end face a selected distance from the axis, and removable weights in each of the orifices, comprising the steps of
   securing the rotary tool in a balancing machine,
   identifying any unbalanced conditions in the rotary tool with the balancing machine, and
   removing or changing at least one weight in at least one of the orifices to correct the unbalanced condition.

* * * * *

UNITED STATES PATENT AND TRADEMARK OFFICE
CERTIFICATE OF CORRECTION

PATENT NO. : 5,125,777
DATED : June 30, 1992
INVENTOR(S) : Osawa

It is certified that error appears in the above-identified patent and that said Letters Patent is hereby corrected as shown below:

Add the following information on the cover page following the filing date:

[30]   Foreign Application Priority Data
   Dec. 18, 1989   [JP]   Japan   1-46191

Signed and Sealed this

Seventh Day of June, 1994

Attest:

BRUCE LEHMAN

Attesting Officer    Commissioner of Patents and Trademarks

REEXAMINATION CERTIFICATE (3435th)
United States Patent [19]
Osawa

[11] B1 5,125,777
[45] Certificate Issued    *Feb. 3, 1998

[54] ROTARY TOOL

[76] Inventor: Eiichi Osawa, 5-16-54 Yoshida, Higashi-Osaka, Osaka, Japan

Reexamination Request:
No. 90/004,423, Oct. 18, 1996

Reexamination Certificate for:
Patent No.: 5,125,777
Issued: Jun. 30, 1992
Appl. No.: 693,862
Filed: May 1, 1991

[*] Notice: The portion of the term of this patent subsequent to Jul. 23, 2008, has been disclaimed.

Certificate of Correction issued May 9, 1994.

Related U.S. Application Data

[63] Continuation-in-part of Ser. No. 547,633, Jul. 2, 1990, Pat. No. 5,033,923.

[30] Foreign Application Priority Data

Dec. 18, 1989 [JP] Japan ............... 1-146191 U

[51] Int. Cl.$^6$ .................................................. B23C 5/16
[52] U.S. Cl. ............ 409/234; 74/573 R; 279/129; 279/158; 407/30; 407/120; 408/239 R
[58] Field of Search ............... 279/129, 158; 408/238, 239 R, 240; 409/131, 132, 232, 234; 82/903; 407/30, 33, 34, 53, 54, 120; 451/343; 74/573 R

[56] References Cited

U.S. PATENT DOCUMENTS

| | | |
|---|---|---|
| 525,799 | 9/1894 | Rymes. |
| 861,463 | 7/1907 | Hyde .................. 51/169 |
| 1,645,343 | 10/1927 | Moorhouse. |
| 1,949,478 | 3/1934 | Kindelmann et al.. |
| 1,980,693 | 11/1934 | Newman et al.. |

(List continued on next page.)

FOREIGN PATENT DOCUMENTS

| | | |
|---|---|---|
| 585457 | 10/1933 | Germany. |
| 914673 | 7/1954 | Germany. |
| 1573764 | 4/1965 | Germany. |
| 211074 | 7/1984 | Germany. |
| 3340320 | 5/1985 | Germany. |
| 3633320 | 6/1987 | Germany. |
| 3733338 | 4/1989 | Germany. |
| 3911163 | 10/1989 | Germany. |
| 61-24105 | 2/1986 | Japan. |
| 62-140342 | 6/1987 | Japan. |
| 62-140343 | 6/1987 | Japan. |
| 63-10768 | 1/1988 | Japan. |
| 1216736 | 8/1989 | Japan. |
| 253312 | 4/1990 | Japan. |

OTHER PUBLICATIONS

Pages from publication entitled CNC–West published in CNC–West, Feb./Mar. 1990, pp. 52–54, article by Mike Englebrecht, "How to Tool Up High Speed Machining Centers", and p. 218 regarding Hoffman exhibit preview.

Facsimile dated Apr. 22, 1991 from Mike Englebrecht to Lyndex Corp. of Reference B with altered figures and an additional page entitled "High Speed Rotation Holder" p. 1, along with testimony and pertinent exhibits deposition of Mike Englebrecht (pp. 53–72).

Schneider/Walter, "Auswuchttechnik und Auswuchtmaschinen", p. 127, (1969).

Schneider, "Auswuchttechnik", pp. 30 and 140 (1981).

VDI 3248, p. 6, Sep. 1966.

Gebr. Heller, Zeichnung 03 097 091 drawings (2 pages) (1984).

(List continued on next page.)

*Primary Examiner*—Steven C. Bishop

[57] ABSTRACT

A rotary tool is provided with a shank and a collar-like section, and further includes a plurality of screw-threaded holes drilled in a vertical end face of the collar-like section, in parallel relationships with the axis of the collar-like section. A plurality of balancing weights are removably screwed in the holes as required to balance the tool.

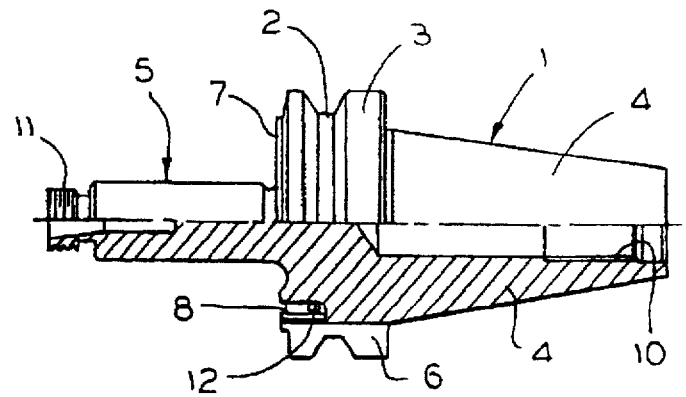

U.S. PATENT DOCUMENTS

| | | |
|---|---|---|
| 2,241,637 | 5/1941 | Ernst et al. . |
| 2,440,908 | 5/1948 | Mueller . |
| 2,861,471 | 11/1958 | Kronenberg . |
| 2,958,165 | 11/1960 | Hoffman . |
| 3,000,240 | 9/1961 | Eckardt . |
| 3,029,567 | 4/1962 | Gregora . |
| 3,151,488 | 10/1964 | Tracy et al. ............................ 74/573 R |
| 3,302,491 | 2/1967 | Bjorn et al. . |
| 3,339,430 | 9/1967 | Klein . |
| 3,521,846 | 7/1970 | Copony . |
| 3,528,316 | 9/1970 | Hammer . |
| 3,559,512 | 2/1971 | Aggarwal . |
| 3,698,263 | 10/1972 | Ito . |
| 3,812,725 | 5/1974 | Frank et al. . |
| 3,838,464 | 9/1974 | Doyle ................................. 74/573 R X |
| 3,923,414 | 12/1975 | Hopkins . |
| 3,999,632 | 12/1976 | Armbrust et al. . |
| 4,107,257 | 8/1978 | Swin, Sr. . |
| 4,118,989 | 10/1978 | Wood . |
| 4,202,213 | 5/1980 | Toriselli . |
| 4,294,135 | 10/1981 | Tameo . |
| 4,423,632 | 1/1984 | Madden et al. . |
| 4,478,293 | 10/1984 | Weilenmann et al. . |
| 4,543,825 | 10/1985 | Schonfeld et al. . |
| 4,626,144 | 12/1986 | Berner . |
| 4,648,763 | 3/1987 | Safranek . |
| 4,692,069 | 9/1987 | Kieninger . |
| 4,697,484 | 10/1987 | Klee et al. . |
| 4,697,489 | 10/1987 | Klee et al. ............................ 279/1 C X |
| 4,721,423 | 1/1988 | Kubo . |
| 4,865,336 | 9/1989 | Keritsis ................................ 279/1 J X |
| 4,918,985 | 4/1990 | Rollet . |
| 4,951,526 | 8/1990 | Linder . |
| 5,033,923 | 7/1991 | Osawa ................................. 279/1 ME |
| 5,074,723 | 12/1991 | Massa et al. . |
| 5,096,345 | 3/1992 | Toyomoto . |
| 5,133,226 | 7/1992 | Muller . |
| 5,154,554 | 10/1992 | Ariyoshi . |
| 5,240,358 | 8/1993 | Hackett et al. . |
| 5,263,995 | 11/1993 | Mogilnicki et al. . |
| 5,407,308 | 4/1995 | Takayoshi . |
| 5,427,484 | 6/1995 | Galli . |

OTHER PUBLICATIONS

Gebr. Heller, Werksnormblatt TN 5.212 r7 nR.2. (1985).

Product literature entitled "Radauswuchtmaschinen fur PKW–und Motorrad–Rader" Schenck A–S–G. Rapid 40 50.

Product literature entitled "Druckluftdosen" Series COD and COP with drawings and English description setting forth translated portions of text in the documents (16 pages).

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–3 and 5–9 is confirmed.

Claim 4 is cancelled.

* * * * *